United States Patent [19]

Ritter et al.

[11] Patent Number: 5,489,389
[45] Date of Patent: Feb. 6, 1996

[54] NEW LEATHER OILING PREPARATIONS AND THEIR USE

[75] Inventors: Wolfgang Ritter, Haan; Rudolf Zauns-Huber, Duesseldorf; Emil Ruscheinsky, Leverkusen; Stefanie Ortanderl, Juechen, all of Germany

[73] Assignee: Henkel Kommanditgesellschaft auf Aktien, Duesseldorf, Germany

[21] Appl. No.: 373,312

[22] Filed: Feb. 17, 1995

[30] Foreign Application Priority Data

Jul. 14, 1992 [DE] Germany .................. 42 23 110.8

[51] Int. Cl.$^6$ ..................................... C14C 9/00
[52] U.S. Cl. ............... 252/8.57; 8/94.1 R; 8/94.19 R; 8/94.22; 8/94.23; 8/94.33; 427/323; 427/389
[58] Field of Search ............... 252/857; 427/389, 427/323; 8/94.19 R, 94.33, 94.22, 94.1 R; 560/157

[56] References Cited

U.S. PATENT DOCUMENTS

| 4,056,493 | 11/1977 | Tsou ......................... 106/253 |
| 4,755,187 | 7/1988 | Friese et al. .................. 8/94.23 |
| 5,151,329 | 9/1992 | Noll et al. ..................... 427/389 |

FOREIGN PATENT DOCUMENTS

| 0193832 | 9/1986 | European Pat. Off. . |
| 0213480 | 3/1987 | European Pat. Off. . |
| 0372746 | 6/1990 | European Pat. Off. . |
| 0412389 | 2/1991 | European Pat. Off. . |
| 0418661 | 3/1991 | European Pat. Off. . |
| 0444454 | 9/1991 | European Pat. Off. . |
| 2159408 | 6/1973 | France . |
| 1916972 | 11/1969 | Germany . |
| 1669347 | 5/1971 | Germany . |
| 3942681 | 6/1991 | Germany . |
| 4129244 | 3/1993 | Germany . |
| 9200337 | 1/1992 | WIPO . |

OTHER PUBLICATIONS

"Polyurethanes, Chemistry and Technology", vol. XVI of the High Polymers Series, Interscience Publishers, New York/London, Part I (1962) and Part 2 (1964) [no month].

*Primary Examiner*—Anthony Green
*Attorney, Agent, or Firm*—Ernest G. Szoke; Wayne C. Jaeschke; Real J. Grandmaison

[57] ABSTRACT

An aqueous dispersion of amphiphilic oligomers for oiling leather or skins wherein the dispersion contains anionically modified urethane fatty oligomers containing long-chain hydrocarbon fatty groups containing from 8 to 40 carbon atoms, together with salt-forming carboxylic acid groups, sulfonic acid groups and mixtures thereof, which form urethane fatty oligomers having an at least predominantly linear basic structure of the oligomer molecule.

9 Claims, No Drawings

NEW LEATHER OILING PREPARATIONS AND THEIR USE

BACKGROUND OF THE INVENTION

1. Field of the Invention

The oiling of vegetable- and/or mineral-tanned leathers and skins is an essential step in the finishing process leading to the ready-to-use material. The form in which the oil is distributed in the skin and the extent to which the oil components are fixed in the skin critically influence the properties and performance of the end products. Extensive expert knowledge exists on possible interactions between the oil components on the one hand and the tanned skin containing residual tanning agents on the other hand. The particular composition of the oiling preparations—for example the number of lipophilic groups and reactive groups present, if any, for reaction with suitable reactive constituents in the tanned leather—determine inter alia the permanence and effectiveness of the oil finish in the practical use of the leathers and skins.

An important practical aspect lies in the provision of oil finishes which can be so reliably fixed in the tanned skin that the leathers and skins are sufficiently resistant to washing and cleaning for practical requirements. High-quality leather goods, for example from the clothing industry, are expected to lend themselves both to washing with water/detergents and also to dry cleaning without any significant loss of quality. There are also special cases where the finished leather is required to show sufficient impermeability to water.

2. Discussion of Related Art

In principle, there are in particular three known processes for the waterproof finishing of leather and skins:

1. impregnation by incorporation of water-insoluble compounds, for example solid fats, waxes or special polymers, 2. impregnation by incorporation of water-swelling compounds which form highly viscous emulsions on taking up water and which block the fiber interstices of the leather, for example special emulsifiers of the w/o type, 3. treatment with hydrophobicizing compounds, for example aluminium, chromium and/or zirconium complexes, silicones or organic fluorine compounds.

DE I 669 347 describes the use of water-emulsifiable sulfosuccinic acid semiesters for oiling leather, although no waterproof effects are obtained. EP 193 832 relates to a process for the production of waterproof leathers and skins using sulfosuccinic acid monoesters in combination with impregnating and/or hydrophobicizing oiling preparations, the process being characterized in that, after retanning, the leathers and skins are treated in an aqueous liquor with impregnating and/or hydrophobicizing oiling preparations containing sulfosuccinic acid monoester salts with $C_{12-24}$ fatty groups and, after acidification, are fixed by addition of a chromium, zirconium and/or aluminium salt. The sulfosuccinic acid monoester salts are preferably used with impregnating oiling preparations from the group of oxidized or oxidized and partly sulfonated $C_{18-26}$ hydrocarbons and $C_{32-40}$ waxes, phosphoric acid mono-$C_{12-24}$-alkyl esters, citric acid mono-$C_{16-24}$-alkyl esters, sorbitan, glycerol and/or pentaerythritol $C_{16-24}$ fatty acid esters.

Amphiphilic preparations in the form of selected co-oligomers of, on the one hand, hydrophobic or oleophilic monomers and, on the other hand, hydrophilic monomers have recently been described for the oiling of, in particular, mineral-tanned leathers and skins. Amphiphilic preparations of this type may be incorporated, for example by milling, in the leathers or skins to be finished in the form of aqueous dispersions, emulsions and/or solutions on completion of the main tanning process. In the case of mineral-tanned leathers or skins in particular, the amphiphilic preparations may also perform the retanning function. Finally, the amphiphilic preparations may be fixed, more particularly with mineral tanning agents. The more recent patent literature describes auxiliaries of the type in question. For example, EP 372 746 describes corresponding preparations and their use, the amphiphilic copolymers consisting predominantly of at least one hydrophobic monomer and, to a lesser extent, of at least one copolymerizable hydrophilic monomer. The hydrophobic monomers listed include long-chain alkyl (meth)acrylates, long-chain alkoxy or alkylphenoxy (polyethylene oxide) (meth)acrylates, primary alkenes, vinyl esters of long-chain alkyl carboxylic acids and mixtures thereof. The hydrophilic comonomers forming the minor component of the copolymers are ethylenically unsaturated water-soluble acids or hydrophilic basic comonomers. The molecular weight (weight average) of the copolymers is in the range from 2,000 to 100,000.

EP 412 389 describes the use of copolymers which have been prepared by radical bulk copolymerization of (a) $C_{8-40}$ monoolefins with (b) ethylenically unsaturated $C_{4-8}$ dicarboxylic anhydrides at temperatures of 80° to 300° C. to form copolymers with molecular weights of 500 to 20,000 g/mole, subsequent solvolysis of the anhydride groups of the copolymers and at least partial neutralization of the carboxyl groups formed during the solvolysis with bases in aqueous medium and which are present in the form of aqueous dispersions or solutions as preparations for hydrophobicizing leather and skins. EP 418 661 describes the use for the same purpose of copolymers which contain (a) 50 to 90% by weight of $C_{8-40}$ alkyl (meth)acrylates, vinyl esters of $C_{8-40}$ carboxylic acids or mixtures thereof and (b) 10 to 50% by weight of monoethylenically unsaturated $C_{3-12}$ carboxylic acids, monoethylenically unsaturated dicarboxylic anhydrides, semiesters or semiamides of monoethylenically unsaturated $C_{4-12}$ dicarboxylic acids, amides of $C_{3-12}$ monocarboxylic acids or mixtures thereof in copolymerized form and which have molecular weights of 500 to 30,000 g/mole. For the stated application, the copolymers are at least partly neutralized and are present in the form of aqueous solutions or aqueous dispersions.

Applicants' earlier patent application DE-A 41 29 244 relates to the use of aqueous dispersions of co-oligomers from the radical-initiated aqueous emulsion copolymerization at mildly acidic to neutral pH values of (a) semiesters of maleic acid with oleophilic alcohols and/or lower alkylene oxide adducts thereof and (b) acrylic acid and/or methacrylic acid as principal components which may additionally contain (c) small quantities of other hydrophilic and/or oleophilic comonomers in the oligomer molecule, as amphiphilic preparations for the oiling and water-resistant finishing of leathers and skins.

DESCRIPTION OF THE INVENTION

The teaching according to the invention seeks to use a class of oligomer or polymer compounds hitherto unknown for the oiling of leathers and skins which, on the one hand, are anionically modified, but which on the other hand are made into a material with pronounced oiling properties by corresponding synthesis or substitution. According to the teaching of the invention, the basic structure of the polymer compounds is provided by the class of polyurethanes known per se, corresponding compounds of comparatively low molecular weight being particularly suitable for the purposes of the invention. Accordingly, the term "urethane oligomer compounds" is generally used in the following definition of the invention. By suitably building up the basic structure of the urethane polymer molecule and by providing the polyurethane molecules with the specific amphiphilic character according to the invention (simultaneous presence of distinctly oleophilic molecule constituents of distinctly oiling character and hydrophilic, more particularly anionically modified substituents at the urethane polymer molecule), the teaching according to the invention provides new leather oiling preparations which provide for high individualization or rather development of the particular functions required of the finishing preparation in the final leather. The primary objectives in this regard are the reliable oiling effect in conjunction with reliable fixing of the oiling preparation in the fiber structure of the leather or skin. In addition, it may be desirable simultaneously to use the oiling polyurethane compounds as retanning agents. This presupposes not only adequate fixing of the polyurethane-based preparation in the fiber structure, but also and above all ease of application and reliable penetration of the oiling and, optionally, retanning amphiphilic preparation in the skin or rather leather structure.

Retanning agents based on polyurethanes, more particularly cationically modified urethane polymers or oligomers, are known both from the literature and from practice, cf. corresponding commercial products.

The polyurethane-based auxiliaries according to the invention differ from these known auxiliaries in the polyfunctionality of the molecule structure with the emphasis on the oiling finish. In preferred embodiments, the problem addressed by the invention is to provide oiling leather and skin finishes which are resistant to washing and/or dry cleaning.

In a first embodiment, therefore, the present invention relates to water-dispersible and/or water-emulsifiable urethane-based oligomers of fatty character (hereinafter referred to in the interests of simplicity as "urethane fatty oligomers") containing hydrocarbon-based fatty groups together with acid groups capable of salt formation for an at least predominantly uncrosslinked basic structure of the polymer or oligomer molecule as amphiphilic preparations for the oiling and, optionally, tanning of leather and skins.

In this embodiment, the teaching of the invention can be particularly important for the finishing of mineral-tanned leathers and/or skins, in which case the amphiphilic preparations according to the invention may simultaneously perform the retanning function.

In another embodiment, the present invention relates to aqueous dispersions of the anionically modified urethane polymers or oligomers of fatty character (also referred to as "amphiphilic urethane fatty oligomers" in the description of the invention) which contain longchain hydrocarbon fatty groups together with acid groups capable of salt formation for an at least predominantly uncrosslinked basic structure of the polymer or oligomer molecule, are adjusted to pH values in the mildly acidic to mildly alkaline range and, in particular, are present as water-dilutable pastes with activesubstance contents of around 20 to 70% by weight.

The basic element of the teaching according to the invention is the use of the amphiphilic oligomer or polymer compounds using expert knowledge to synthesize corresponding polyurethane-based compounds.

It is known that urethane groups are formed by reaction of isocyanate groups with hydroxyl groups. The corresponding oligomers and/or polymers are obtained by polymer-analog reaction of polyfunctional reactants both on the isocyanate side and on the side of the compounds providing hydroxyl groups. To produce uncrosslinked, for example substantial linear molecule structures, difunctional isocyanate compounds are used together with diols as the main participants in this reaction. It can be of advantage to use monofunctional isocyanate-reactive components, more particularly monohydric alcohol compounds, to limit and regulate the average molecular weight. Accordingly, the reaction of the polyfunctional isocyanates with mixtures of polyhydric and monohydric alcohols also falls within the scope of the invention. In one preferred embodiment, the substantially uncrosslinked basic polyurethane structure required in accordance with the invention is built up by reacting with one another compounds which are at least predominantly difunctional both on the isocyanate side and on the polyhydric alcohol side.

Suitable difunctional isocyanate components are any known aliphatic, cycloaliphatic and/or aromatic diisocyanates which, in the case of corresponding ring compounds, may have one and/or more nuclei. The following are examples of individual representatives from the groups in question:

Aliphatic, linear or even branched diisocyanates may be obtained, for example, by reaction of corresponding diamines. Typical representatives are, for example, hexamethylene diisocyanate, trimethyl hexamethylene diisocyanate or tetramethylene diisocyanate. Examples of cycloaliphatic, mononuclear or polynuclear diisocyanates are isophorone diisocyanate and dicyclohexylmethane diisocyanate. Typical aromatic mononuclear or polynuclear diisocyanates are, for example, xylylene diisocyanate or diphenylmethane diisocyanates of the 4,4'-diphenylmethane diisocyanate type. Isocyanate compounds where the isocyanate groups have a functionality of more than 2 are known to lead to increasingly crosslinked reaction products with increasing hardness and brittleness and, accordingly, are not compatible with the object of the invention of using supple, soft and distinctly oiling urethane fatty oligomers in the fiber structure. Information on the effect of higher functionalities (functionalities above 2) both on the isocyanate side and on the polyol side can be found in the literature, cf. for example the book by Saunders and Frisch entitled "Polyurethanes, Chemistry and Technology", Vol. XVI of the High Polymers Series, Interscience Publishers, New York/London, Part I (1962) and Part 2 (1964).

In the context of the teaching according to the invention, these oligomer chains containing a plurality of urethane groups are bearers of the two basically opposing functions responsible for the amphiphilic character of the polymer molecule: oleophilic structural elements of distinctly fatty character which guarantee both the suppleness and the water-repellent effect of the impregnating finish and, on the other hand, hydrophilic and, in particular, anionic structural elements which fix the oligomer molecules in the fiber structure in known manner and, in one preferred embodiment, can additionally perform the retanning function.

The two structural elements combined in one polymeric molecule are long-chain hydrocarbon radicals of distinctly oleophilic character as the hydrophobic structural element and acid groups capable of salt formation or rather salts thereof dissociable in aqueous phase as the hydrophilic structural element. More particularly, the following representatives are preferred for these two functions:

Oleophilic molecule constituents of distinctly oiling character are hydrocarbon fatty groups with a sufficiently long carbon chain. Corresponding fatty groups containing 8 to 40 carbon atoms are preferred, those containing 12 to 32 carbon atoms being particularly preferred. It can be of particular advantage to provide these fatty groups as lateral substituents along the polyurethane chain and/or as molecular-weight-limiting terminal members of the urethane fatty polymer. Relevant particulars will be given in the following. Typical representatives of such hydrocarbon-based fatty groups are corresponding residues of fatty acids and/or fatty alcohols of natural and/or synthetic origin. These oiling hydrocarbon radicals may be linear and/or branched. They may be saturated or even at least partly mono-olefinically and/or polyolefinically unsaturated. In individual cases, the oiling and water-repellent effect of the amphiphilic preparation according to the invention after application to the leather or skin can be influenced through the particular character and/or through the quantity of hydrocarbon fatty groups present in the urethane fatty polymer. The general knowledge of the expert may be used in this regard. It is emphasized merely by way of example that the water-repellent effect of the urethane fatty oligomer can be enhanced by increasing the chain length and/or the concentration of the corresponding fatty groups. Suppleness, the penetration of the urethane fatty oligomer into the fiber structure and/or the lubricating behavior on the impregnated leather can be influenced by the partial use of branched hydrocarbon radicals, more particularly in admixture with linear radicals, and/or by the use or co-use of olefinically unsaturated fatty groups. The use or co-use of olefinically unsaturated residues of fatty acids or fatty alcohols can be important in the practical application of the impregnated leathers where hydrolytic influences can be expected to cause problems.

Particularly suitable oiling structural elements of the type in question are derived from corresponding fats of natural origin and, hence, go back to fatty carboxylic acids or corresponding fatty alcohols in the $C_{12-22}$ and, more particularly, $C_{12-18}$ range. However, dimerization products of such natural materials which would then contain 16 to 36 carbon atoms, for example, are also interesting representatives of the functional units of the urethane fatty oligomers in question.

These hydrophilic oiling components may be incorporated by any methods known per se. For example, corresponding components may be introduced by way of the diisocyanates to be used in the polyurethane forming reaction by subjecting polyisocyanate compounds with a functionality of more than 2 to a partial reaction with, for example, corresponding monohydric fatty alcohols, returning the isocyanate functionality to values of, on average, 2 and then subjecting the diisocyanates thus fat-substituted to a reaction with diols and, optionally, monohydric alcohols.

In general, it is simpler to introduce the hydrophobic oiling constituents via the diol components and/or the monohydric alcohols used, if any. Monohydric fatty alcohols suitable for the purposes of the invention may be provided as terminal members of the urethane fatty oligomers. In this position, they develop their intended effect throughout the property spectrum of the oiling preparations used in accordance with the invention. However, correspondingly oiling hydrocarbon radicals may also be introduced into the PUR molecule in particular through the diol components. The following are mentioned as examples of such diols: partial esters of polyhydric alcohols having a functionality of at least 3 with suitable fatty acids, for example monoesters of glycerol with saturated and/or unsaturated fatty acids, such as glycerol monostearate and/or glycerol monooleate. However, fatty acids may also be reacted with dialkanolamines to form the corresponding fatty acid dialkanolamides and the corresponding diol (for example a fatty acid diethanolamide) subsequently introduced as diol component into the PUR forming reaction.

According to the invention, preferred hydrophilic constituents based on the salt-forming acid groups are corresponding constituents containing carboxyl and/or sulfonic acid groups. Compounds of this type are readily available as natural substances and/or as synthetic products. In addition, they are used in practice in the production of so-called self-emulsifying PUR compounds. To this extent, the teaching according to the invention makes use of existing expert knowledge. For example, it is known in this connection that dimethylol propionic acid can be used as diol component in the PUR forming reaction. Dimethylol propionic acid may also be used in accordance with the invention to introduce the hydrophilic carboxyl group. Another example of a corresponding diol carboxylic acid is tartaric acid which leads to an increased concentration of carboxyl groups.

More particularly, however, the increased concentration of acid groups required in accordance with the invention may also be introduced into the molecule through potential terminal groups of the urethane fatty oligomer. Thus, alcohols bearing one or more carboxylic acid groups can be important reactants in the synthesis of the urethane fatty oligomers. The following carboxylic acids are mentioned purely by way of example: glycolic acid, lactic acid, hydroxybutyric acid, hydroxyvaleric acid, malic acid, tartaric acid, citric acid and/or ascorbic acid.

The foregoing observations on the introduction of carboxyl groups into the urethane fatty oligomer apply correspondingly to the synthesis of corresponding amphiphilic preparations containing sulfonic acid groups. In this case, suitable reactants are, for example, mono- and/or disulfonic acids containing hydroxyl groups.

Urethane fatty oligomers containing on average both a plurality of acid groups and, preferably, a plurality of hydrocarbon fatty groups per oligomer molecule are preferably used for the purposes of the invention. With the assistance of general expert knowledge and the foregoing observations on possible reactants for the synthesis of the amphiphilic urethane oligomers, optimization may readily be established in the particular individual case selected. In this connection, the following two possibilities for the production of the anionically modified fatty oligourethanes are emphasized once more purely by way of example:

Diisocyanates of the type mentioned at the beginning may be reacted with (a) mixtures of diols containing acid groups, more particularly carboxylic acid groups, and optionally monohydric fatty alcohols or with (b) mixtures of diols containing fatty groups and hydroxycarboxylic acids or hydroxysulfonic acids containing one or more hydroxyl and/or carboxylic acid or sulfonic acid groups.

The use of amphiphilic urethane fatty oligomers of the described type containing different acid groups also falls within the scope of the teaching according to the invention. Examples include compounds which contain both carboxyl groups and sulfonic acid groups, but which may also be modified by residues of organic phosphoric acid compounds.

The PUR fatty oligomers have preferred average molecular weights in the range from about 500 to 30,000 g/mole. Molecular weights in the range from about 1,000 to 15,000 g/mole can be particularly suitable. It has been found that, within these comparatively broad ranges, the lower values—average molecular weights in the range from about 1,000 to 4,000 or 5,000 g/mole and best in the range from about 1,000 to 3,000 g/mole—can be particularly important.

According to the invention, the PUR oligomers ultimately used are best present in the form of aqueous dispersions and/or emulsions which have preferably been adjusted to a mildly acidic to mildly alkaline pH value. So far as stability in storage is concerned, it can be useful to formulate preparations of which the aqueous phase is adjusted to neutral to mildly alkaline pH values by addition of inorganic and/or organic bases. Any bases described in the relevant prior art may be used for pH adjustment, cf. also the disclosures of the prior art cited at the beginning. Preferred pH values for storable products may be in the range from pH 7 to 8. Water-based pastes with a PUR oligomer content of, for example, around 20 to 70 or 75% by weight can be prepared in this way. Pastes such as these can always be mixed with water and/or aqueous active-substance mixtures of the type described hereinafter and used in practice.

One important embodiment of the invention is characterized by the use of amphiphilic preparations of the described type together with selected emulsifiers which, on introduction into—in particular—mineral-tanned leathers and/or skins, have an additional oiling or hydrophobicizing effect and which, at the same time, can preferably be fixed in the tanned leather or skin through acidic groups. One important example of compounds of this type are the water emulsifiable sulfosuccinic acid semiesters mentioned at the beginning which emanate from long-chain fatty alcohols and/or alkylene oxide adducts thereof. The foregoing observations on the UR fatty oligomers apply to the particular character of the alcohols. One important example of emulsifiers belonging to the class in question are $C_{18}$ sulfosuccinate semiesters. It has been found that advantageous effects can be achieved by using emulsifier-like auxiliary components such as these—which are known per se as leather oiling finishes—to assist in solving the problem addressed by the present invention. The following are mentioned as examples of compounds of this type: sulfosuccinic acid semiesters of long-chain fatty alcohols containing in particular 12 to 24 carbon atoms and/or alkylene oxide adducts thereof preferably containing up to 6 alkylene oxide units, corresponding sulfosuccinic acid semiesters of fatty acid mono- and/or diglycerides or alkylene oxide adducts thereof preferably containing up to 6 alkylene oxide units for a preferred chain length of the fatty acid(s) of $C_{12-24}$, long-chain sulfofatty acids, more particularly corresponding alpha-sulfofatty acids preferably containing 12 to 24 and, more preferably, 16 to 18 carbon atoms (in the case of these alpha-substituted sulfofatty acids, the hydrocarbon radicals are normally saturated) and internal sulfofatty acids of monoolefinically and/or polyolefinically unsaturated carboxylic acids, such as oleic acid, linoleic acid, linolenic acid and the like.

However, oiling or hydrophobicizing preparations based on the mixtures known from EP 193 832 cited at the beginning may also be used together with the fatty oligomers for the purposes of the invention. In this embodiment of the invention, therefore, the PUR oligomers defined in accordance with the invention—combined with impregnating and/or hydrophobicizing oiling agents, such as sulfosuccinic acid monoester salts with $C_{12-24}$ fatty groups—are used in combination with other impregnating oiling agents selected in particular from the group of oxidized or oxidized and partly sulfonated $C_{18-26}$ hydrocarbons or $C_{32-40}$ waxes. Other examples of these additional impregnating oiling agents are phosphoric acid mono-$C_{12-24}$-alkyl esters, partial esters of polycarboxylic acids, such as citric acid mono-$C_{16-24}$-alkyl esters, partial esters of polyalcohols, such as sorbitan, glycerol or pentaerythritol $C_{16-24}$ fatty acid esters.

One particularly suitable class of emulsifiers which may be used in accordance with the teaching of the invention are the N-acyl aminoacids known from the oiling of leathers and skins, more particularly the fatty acid sarcosides (for example N-oleoyl sarcosine) which are described in detail in EP-B10 213 480, for example, as emulsifiers for the introduction of silicone oils into leathers and skins. Accordingly, particularly suitable emulsifiers are salts of N-($C_{9-20}$ acyl)-aminoacids, particular significance being attributed to corresponding salts of a $C_{2-6}$ aminoacid substituted at the amine nitrogen by the acyl group of a saturated or unsaturated $C_{9-20}$ fatty acid which may optionally be additionally substituted by methyl. Particularly suitable salts of these emulsifiers are, again, alkali metal, ammonium or alkanolamine salts.

Of the N-($C_{9-20}$ acyl)-aminoacids, those containing 2 to 4 carbon atoms with the amino group in the alpha-position to the carboxyl group, which again may additionally be substituted by a methyl group at the amine nitrogen atom, are preferred. Of these, the fatty acid sarcosides of saturated or unsaturated fatty acids containing 9 to 20 and preferably 16 to 18 carbon atoms have a particularly superior effect. The preferred sarcoside is oleic acid sarcoside. In addition, N-stearoyl sarcosine, N-lauroyl sarcosine and N-isononanoyl sarcosine—in the form of their alkali metal salts, ammonium salts or salts of mono-, di- or trialkanolamines, in particular with 2 to 4 carbon atoms in the alkanol group—are particularly suitable.

Where mixtures such as these are used, the quantity of UR fatty oligomers according to the invention preferably makes up at least about 35% by weight and, more preferably, at least about 50% by weight of the mixture (on the same basis as before). In one preferred embodiment, at least about 70 to 80% by weight of the total mixture to be introduced into the leathers or skins to be finished may be based on the amphiphilic oligomers or polymers according to the invention.

The fatty oligomers in the form of an aqueous dispersion or in the form of mixtures with the other components mentioned are introduced in known manner, cf. in particular the disclosures of the above-cited documents for comparable products. Accordingly, their introduction may be briefly summarized as follows:

The oligomer dispersions according to the invention are suitable for the treatment of any standard tanned skins, more particularly corresponding material which has been tanned with mineral tanning agents. The tanned skins are normally deacidified before the treatment. They may have been dyed before the treatment. However, dyeing may also be carried out after the treatment according to the invention.

The leather to be impregnated is treated with the dispersions in an aqueous liquor, best at pH values of around 4 to 10 and preferably at pH 5 to 8 and at temperatures of around 20° to 60° C. and preferably at temperatures of 30° to 50° C. over a period of up to a few hours and optionally in several stages. The treatment is carried out, for example, by milling in a drum. The quantity of oligomer dispersion required is normally in 0.1 to 30% by weight and, more particularly, 1 to 20% by weight, based on the pared weight of the leather or the wet weight of the skins. The length of the liquor is normally 10 to 1,000% and preferably 30 to 150% and, in the case of skins, from 50 to 500%.

On completion of the treatment with the aqueous liquor, the pH of the treatment liquor is shifted to a mildly acidic value by addition of acids. Organic acids, preferably formic acid, are particularly suitable for this purpose. Preferred pH values are in the range from 3 to 5 and more preferably in the range from around 3.5 to 4. If desired, the pH adjustment may be followed by fixing, more particularly with mineral tanning agents, the use of aluminium salts and also other polyvalent mineral salts, for example chromium or zirconium salts being particularly preferred.

The following Examples describe the production of PUR fatty oligomers suitable for use in accordance with the invention and then their use for the finishing of leather in accordance with the invention.

EXAMPLES

Example 1

599.4 g of isophorone diisocyanate, 241.2 g of dimethylol propionic acid and 181.8 g of triethylamine are refluxed for 60 minutes together with 3 g of dibutyl tin dilaurate in 1.65 l of acetone. 489.6 g of a fatty alcohol (commercial product "Lorol C18") are then added, followed by refluxing for another 240 minutes. After distillation of the acetone, 3.34 l of water heated to 80° C. are added to the highly viscous material. The dispersion obtained is stable and has a solids content of around 27%.

Example 2

126 g of trimethyl hexamethylene diisocyanate, 53.6 g of dimethylol propionic acid and 40.5 g of triethylamine are refluxed for 60 minutes together with 0.13 g of dibutyl tin dilaurate in 275 g of acetone. 108.8 g of a fatty alcohol (commercial product "Lorol C18") are then added, followed by refluxing for another 180 minutes. After distillation of the acetone, 500 g of water heated to 80° C. are added to the viscous material. The dispersion obtained is stable after stirring for 60 minutes and has a solids content of around 34%.

Example 3

126 g of trimethyl hexamethylene diisocyanate, 53.6 g of dimethylol propionic acid and 40.5 g of triethylamine are refluxed for 60 minutes together with 0.13 g of dibutyl tin dilaurate in 275 g of acetone. 76.1 g of a fatty alcohol (commercial product "Lorol C12") are then added, followed by refluxing for another 180 minutes. After distillation of the acetone, 500 g of water heated to 80° C. are added to the viscous material. The dispersion obtained is stable after stirring for 60 minutes and has a solids content of around 32%.

Example 4

126 g of trimethyl hexamethylene diisocyanate, 40.2 g of dimethylol propionic acid and 30.4 g of triethylamine are refluxed for 60 minutes together with 0.39 g of dibutyl tin dilaurate in 250 g of acetone. 163.2 g of a fatty alcohol (commercial product "Lorol C18") are then added, followed by refluxing for another 240 minutes. After distillation of the acetone, 540 g of water heated to 80° C. are added to the viscous material. The dispersion obtained is stable after stirring for 60 minutes and has a solids content of around 35%.

Example 5

126 g of trimethyl hexamethylene diisocyanate, 40.2 g of dimethylol propionic acid and 30.4 g of triethylamine are refluxed for 60 minutes together with 0.13 g of dibutyl tin dilaurate in 250 g of acetone. 114.1 g of a fatty alcohol (commercial product "Lorol C12") are then added, followed by refluxing for another 330 minutes. After distillation of the acetone, 465 g of water heated to 80° C. are added to the viscous material. The dispersion obtained is stable after stirring for 60 minutes and has a solids content of around 35%.

Example 6

126 g of trimethyl hexamethylene diisocyanate and 53.6 g of dimethylol propionic acid are heated for 90 minutes to 80° C. together with 0.13 g of dibutyl tin dilaurate in 21.6 g of triacetin. 108.8 g of a fatty alcohol (commercial product "Lorol C18") are then added, followed by heating for another 120 minutes. 445 g of water heated to 80° C. are added to the viscous material together with 27.2 g of 25% ammonia solution. The dispersion obtained is stable after stirring for 60 minutes and has a solids content of around 38%.

Example 7

126 g of trimethyl hexamethylene diisocyanate and 40.2 g of dimethylol propionic acid are heated for 180 minutes to 80° C. 163.2 g of a fatty alcohol (commercial product "Lorol C18") are then added, followed by heating for another 120 minutes. 490 g of water heated to 80° C. are then added to the viscous material together with 5.1 g of 25% ammonia solution. The dispersion obtained is stable and has a solids content of around 43%.

Example 8

126 g of trimethyl hexamethylene diisocyanate and 40.2 g of dimethylol propionic acid are heated for 120 minutes to 80° C. in 21 g of triacetin. 114.1 g of a fatty alcohol (commercial product "Lorol C18") are then added, followed by heating for another 120 minutes. 415 g of water heated to 80° C. are then added to the viscous material together with 5.1 g of 25% ammonia solution. The dispersion obtained is stable after stirring for 60 minutes and has a solids content of around 39%.

Example 9

157.2 g of dicyclohexylmethane diisocyanate, 53.6 g of dimethylol propionic acid and 40.5 g of triethylamine are refluxed for 180 minutes together with 0.5 g of dibutyl tin dilaurate in 275 g of acetone. 76.1 g of a fatty alcohol (commercial product "Lorol C12") are then added, followed by heating for another 210 minutes. After distillation of the acetone, 420 g of water heated to 80° C. are added to the highly viscous material. The dispersion obtained is stable after stirring for 60 minutes and has a solids content of around 41%.

Example 10

100.9 g of hexamethylene diisocyanate, 53.6 g of dimethylol propionic acid and 40.5 g of triethylamine are refluxed for 90 minutes together with 0.5 g of dibutyl tin dilaurate in 275 g of acetone. 108.8 g of a fatty alcohol (commercial product "Lorol C18") are then added, followed by heating for another 390 minutes. After distillation of the acetone, 455 g of water heated to 80° C. are added to the viscous material. The dispersion obtained is stable and has a solids content of around 35%.

Example 11

The products produced in accordance with Examples 1 to 10 were used and tested in the following leather test (formulation).

| Type of leather: | furniture leather | | | |
|---|---|---|---|---|
| Starting material: | wet blue | | | |
| Percentages based on pared weight | | | | |
| Initial pH: | 3.9 | Thickness: 1.1 mm | | |

| Step | % by weight | Product/remarks | °C. | Running time in mins. | pH |
|---|---|---|---|---|---|
| Washing | 200 | Water | 40 | | |
| | 0.1 | Formic acid | | 30 | 3.5 |
| | | Drain off liquor | | | |
| Neutralization | 100 | Water | 40 | | |
| | 1 | Na formate | | 10 | 4.2 |
| | +2 | Na bicarbonate | | 6 | 5.8 |
| | | Drain off liquor | | | |
| Washing | 300 | Water | 50 | 15 | |
| | | Drain off liquor | | | |
| Dyeing | 100 | Water | 50 | | |
| | 1 | Ammonia | | | |
| | 1 | Commercial product "PELLUPUR 400 N" | | 15 | 8 |
| | +3 | Dye | | 45 | |
| Finishing (hydrophobicizing + retanning) | +6 | Active substance Fatty oligomers acc. to invention | | | |
| | 1 | Active substance Sulfosuccinate | | 90 | |
| | +3 | Mimosa | 30 | | |
| | +1.5 | Formic acid | | 15 | |
| | +1.5 | Formic acid | | 30 | 3.8 |
| | | Drain off liquor | | | |
| Fixing | 100 | Water | 40 | | |
| | 0.5 | Formic acid | | 10 | 3.5 |
| | +4 | Commercial product "BAYCHROM F" | | 90 | 3.9 |
| | | Drain off liquor | | | |
| Washing | 300 | Water | 40 | 15 | |
| | | Drain off liquor | | | |
| Washing | 300 | Water | | 30 | 15 |

Hoard up leather overnight, tenter wet, dry at 50° C./40% relative air humidity, condition, mill, tenter.

The commercial products referred to above are defined in the following:

"PELLUPUR 400 N" is a complex-active, dispersing and levelling dyeing aid

"BAYCHROM F" is an organically masked self-basifying 50% basic chrome tanning agent.

The hydrophobicizing test results shown in Table I below were obtained using a Bally penetrometer in conjunction with test IUP 10 of the Internationale Union der Leder-Chemiker-Verbände, Kommission für physikalische Lederprüfung, cf. das Leder, Vol. 12, 36–40 (1961)):

TABLE 1

| | Penetrometer values at 15% compression | |
|---|---|---|
| Example | Water penetration | Water absorption after 6 h |
| 1 | 140 | 41% |
| 2 | 180 | 33% |
| 3 | 200 | 34% |
| 4 | 130 | 55% |
| 5 | 120 | 62% |
| 6 | 420 | 24% |
| 7 | 240 | 35% |
| 8 | 140 | 43% |
| 9 | 180 | 35% |
| 10 | 230 | 32% |

Resistance to washing and dry cleaning were tested by the following methods:

The conditioned test leathers are cut into 10 cm× 10 cm squares. They are accurately measured, the surface area is established and the samples are weighed before washing and dry cleaning.

a) Washing tests

The leather samples are individually washed in water at 60° C. using a phosphate-free laundry detergent (Persil®). The test is intended to simulate the conditions under which a sports shoe is washed in a domestic washing machine. After washing, the leather samples are dried in air.

b) Dry cleaning

The leather samples are individually cleaned with perchloroethylene in a dry cleaning machine. After cleaning, the leather samples are aired.

After the washing test (a) and the dry cleaning test (b), the leathers are conditioned for 24 hours in accordance with DIN 53303. The characteristic data are determined and evaluated for both tests.

The results obtained are set out in Table II below:

TABLE II

| | Resistance to washing and dry cleaning | | | |
|---|---|---|---|---|
| | Resistance to washing | | Resistance to dry cleaning | |
| Example | w = weight | A = area | w = weight | A = area |
| 1 | −0.40% | −8.20% | −6.1% | −5.3% |
| 2 | −0.52% | −7.30% | −4.2% | −3.7% |
| 3 | −0.54% | −0.78% | −3.7% | −4.2% |
| 4 | −0.45% | −0.35% | −2.4% | −4.1% |
| 5 | −0.61% | −0.45% | −4.6% | −3.8% |
| 6 | −0.50% | −0.45% | −5.2% | −3.8% |
| 7 | −0.42% | −0.38% | −5.2% | −4.2% |
| 8 | −0.45% | −0.42% | −4.8% | −3.5% |
| 9 | −0.43% | −0.51% | −4.9% | −3.8% |
| 10 | −0.50% | −0.48% | −4.5% | −3.5% | w = Difference in weight (− = reduction; + = increase)
A = Difference in area (− = reduction; + = increase)

We claim:

1. A process for oiling leather or skins comprising contacting said leather or skins with an effective amount to oil said leather or skins of an aqueous dispersion of amphiphilic oligomers, said dispersion comprising anionically modified urethane fatty oligomers containing long-chain hydrocarbon fatty groups having from 8 to 40 carbon atoms and salt-forming groups selected from the group consisting of carboxylic acid groups, sulfonic acid groups and mixtures thereof, which form urethane fatty oligomers having an at least predominantly linear basic structure.

2. The process of claim 1 wherein said dispersion is in the form of a water-dilutable paste having an active-substance content of from 20 to 70% by weight.

3. The process of claim 1 wherein said dispersion contains an emulsifier selected from the group consisting of sulfosuccinic acid semiesters of long-chain fatty alcohol containing 12 to 24 carbon atoms, alkylene oxide adducts of sulfosuccinic acid semiesters of long-chain fatty alcohols containing 12 to 24 carbon atoms and having up to 6 alkylene oxide units, sulfosuccinic acid semiesters of fatty acid mono- or diglycerides, alkylene oxide adducts of sulfosuccinic acid semiesters of fatty acid mono- or di-glycerides having up to 6 alkylene oxide units and containing 12 to 24 carbon atoms, alphasulfofatty acids containing 12 to 24 carbon atoms, internal sulfonates of mono- or poly-olefinically unsaturated fatty acids containing at least 12 carbon atoms, salts of an amino acid containing 2 to 6 carbon atoms attached at the amine nitrogen atom to an acyl group of a saturated or unsaturated fatty acid containing 9 to 20 carbon atoms, fatty acid sarcosides, and mixtures thereof.

4. The process of claim 1 wherein said dispersion contains impregnating or hydrophobicizing leather oiling agents consisting essentially of sulfosuccinic acid semi-esters having $C_{12-24}$ fatty residues in combination with a compound selected from the group consisting of oxidized or oxidized and partly sulfonated $C_{18-26}$ hydrocarbons, $C_{32-40}$ waxes, phosphoric acid mono-$C_{12-24}$alkyl esters, partial esters of polycarboxylic acids, partial esters of polyalcohols, and mixtures thereof.

5. The process of claim 4 wherein said partial esters of polycarboxylic acids comprise citric acid mono-$C_{18-24}$-alkyl esters.

6. The process of claim 4 wherein said partial esters of polyalcohols are selected from the group consisting of sorbitan, glycerol, pentaerythritol $C_{18-24}$ fatty acid esters, and mixtures thereof.

7. The process of claim 1 wherein said long-chain hydrocarbon fatty groups contain from 12–32 carbon atom.

8. The process of claim 1 wherein said urethane fatty oligomers have an average molecular weight in the range from about 1,000 to 15,000 g/mole.

9. The process of claim 1 further including fixing said urethane fatty oligomers to said leather or skins by treatment with mineral tanning agents.

* * * * *